Nov. 8, 1966　　　　　LE ROY S. HARRIS　　　　3,284,786
ELECTRIC MOTION OR POSITION TRANSMITTER SYSTEM
AND METHOD OF ADJUSTING THE SAME
Original Filed April 25, 1962　　　　　　　　5 Sheets-Sheet 1

INVENTOR.
LEROY S. HARRIS
BY Howson & Howson
ATTYS.

Nov. 8, 1966  LE ROY S. HARRIS  3,284,786
ELECTRIC MOTION OR POSITION TRANSMITTER SYSTEM
AND METHOD OF ADJUSTING THE SAME
Original Filed April 25, 1962  5 Sheets-Sheet 2
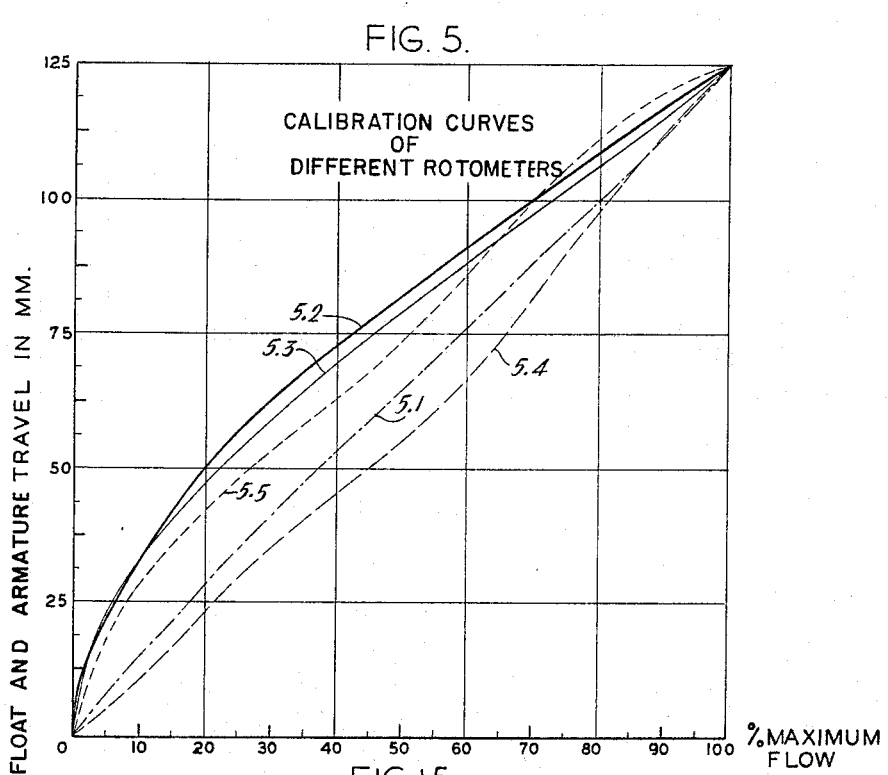
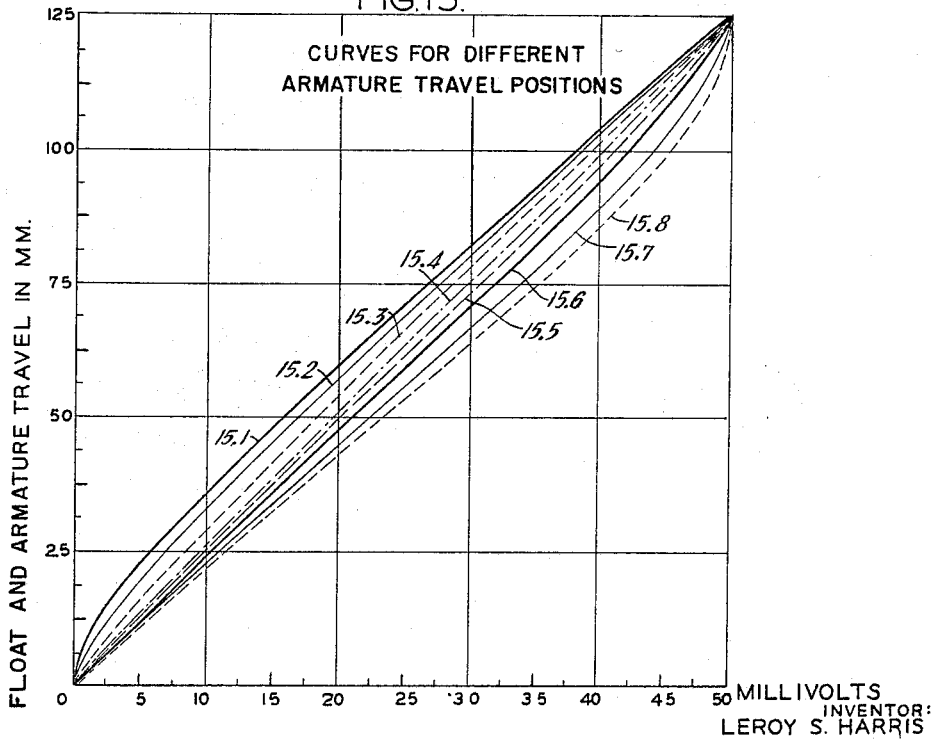
INVENTOR:
LEROY S. HARRIS
BY Howson & Howson
ATTYS.

Nov. 8, 1966  LE ROY S. HARRIS  3,284,786
ELECTRIC MOTION OR POSITION TRANSMITTER SYSTEM
AND METHOD OF ADJUSTING THE SAME
Original Filed April 25, 1962  5 Sheets-Sheet 3

INVENTOR:
LEROY S. HARRIS
BY Howson & Howson
ATTYS.

INVENTOR;
LEROY S. HARRIS
BY Howson & Howson
ATTYS.

INVENTOR:
LEROY S. HARRIS
BY Howson & Howson
ATTYS.

United States Patent Office 3,284,786
Patented Nov. 8, 1966

3,284,786
ELECTRIC MOTION OR POSITION TRANSMITTER SYSTEM AND METHOD OF ADJUSTING THE SAME
Le Roy S. Harris, Huntingdon Valley, Pa., assignor to Schutte and Koerting Company, Cornwells Heights, Pa., a corporation of Pennsylvania
Continuation of abandoned application Ser. No. 190,171, Apr. 25, 1962. This application Aug. 3, 1965, Ser. No. 476,790
1 Claim. (Cl. 340—195)

This is a continuation of application Serial No. 190,171, filed April 25, 1962, now abandoned.

The invention relates to an electric motion or position transmitter system and method of adjusting the same to match the calibration curve of a variable output device and has for an object the provision of improvements in this art.

The invention has been developed for use with rotameters and will be described for such use, although it can have other uses as, for example, for indicating valve positions, liquid levels, manometer indications, specific gravity readings, to name a few.

When a rotameter is calibrated for rate of flow, say in gallons per minute or percentage of maximum flow, compared to float position, say in inches or millimeters above a zero flow position of the float, the curve is usually non-linear and may even have pronounced bumps or points of sharp curvature in places.

When the float operates an armature within electrical coils the curve of output voltage and/or current compared to armature travel should exactly match the calibration curve in order to provide linearity of output signal versus flow to the receiving unit. However, with present available equipment it rarely does and it has been the practice to provide special compensating devices in the receiver or special non-linear indicating scales and charts in the receiver. Such equipment involves added expense and each receiver has to be specially and individually calibrated and adapted to each transmitter. It is an object of the invention to provide a transmitting unit which has an output curve which closely matches the calibration curve of the device with which it is used so that no intermediate compensating components or special non-linear indicating scales are needed.

Another difficulty has been that the output signal from the transducer has been too weak to directly serve many of the receiving units which it may be called upon to serve and it has been a practice to provide an intermediate amplifying unit or rebalance or feedback circuitry between the transducer, transmitter and receiving units. These intermediate units are expensive and it is an object of the invention to provide a transmitter which furnishes a signal of sufficient strength to operate many of the receiving sets which it is expected to serve. For example, without any power amplifying means, such as tubes, transistors, or the like, with the variables which they introduce, but solely from the output of the float-influenced coils or transformer, it may have a D.C. output of 1¾ volts and up to 20 milliamperes.

In order to accomplish the above-mentioned and other objects the present invention provides an improved transmitting circuit and in conjunction therewith uses an armature of such shape and in such relationship to the coils and the coils in such relationship to each other as to substantially match any calibration curve which may be presented and at the same time provides an output signal of sufficient strength to serve many receiving sets.

The invention also provides these results with an armature of very light weight so that the action of the float is very little affected thereby.

The transmitting unit hereby provided is also light in weight and inexpensive.

The above and other objects of the invention as well as various novel features and advantages will be apparent from the following description of an exemplary embodiment, reference being made to the accompanying drawings, wherein:

FIG. 5 is a diagram showing a group of rotameter calibration curves which are to be matched in the transmitting unit output signal;

FIG. 15 is a diagram showing a set of curves produced with one space setting (two spacers) between coils and with different adjusted initial positions of the armature;

Figure 1:
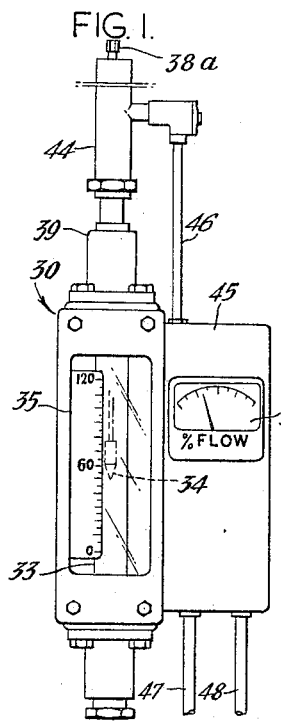
FIG. 1 is a front elevation of a rotameter-transmitter unit embodying the invention.
Figure 2:
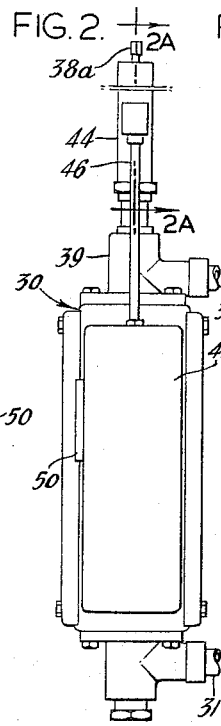
FIG. 2 is a side elevation of the same.

As shown in FIGS. 1 and 2, a rotameter unit 30 has a fluid inlet 31 and fluid outlet 32 with a shaped flow tube 33 therebetween. A float 34 is operably disposed in the flow tube 33 and moves alongside a scale 35 so its tip position can be readily read on the scale. The scale for float travel is here shown to be marked for 125 millimeters of length from zero percent flow to full or 100 percent flow.

Figure 2A:
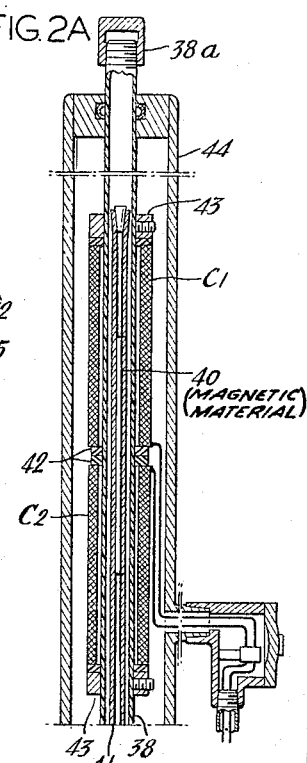
FIG. 2A is an enlarged section taken on the line 2A—2A of FIG. 2.

As shown in FIG. 2A, a non-magnetic armature well tube 38 is secured above the casing 39 of the rotameter, the well being formed to guide the movements of a magnetizable armature 40, as of soft iron, connected to the float by a tubular rod 41 formed of non-magnetic protective material, such for example, as very thin stainless steel, which encloses and holds the armature, and the welll carrying exteriorly thereof and sealed from the liquid a pair of axially adjustable coaxial coils C1, C2 with non-magnetic spacers 42 therebetween. The coils are held in adjusted position by clamp collars 43. A protective outer tube 44 is provided for the coils. For changing the number of spacers or adjusting the position of the coils a tube cap 38a and the protective tube 44 are removed.

The well is here shown to be located above the rotameter casing but it may be located below the casing.

As an idea of one size, the armature may be about eight inches (8") long and about 1/16" diameter; the coils may each be seven and one-half inches (7½") long, and the spacers may be about three millimeters (3 mm.) thick.

The electrical transmitter equipment is housed in a casing 45, the coil connections being carried in a conduit 46, the power connection and ground being carried in a conduit 47, and the output signal connections being carried in a conduit 48.

The initial power input may be 115 volt, 60 cycle A.C. but this is preferably converted by a transformer to 6 volt A.C. carefully regulated to about ±.1%.

A signal output meter 50 is provided at the casing 45 if desired for a direct check of the output at the transmitter. This may be calibrated in percent flow, float position, or in millivolts or in milliamps.

Figure 3:
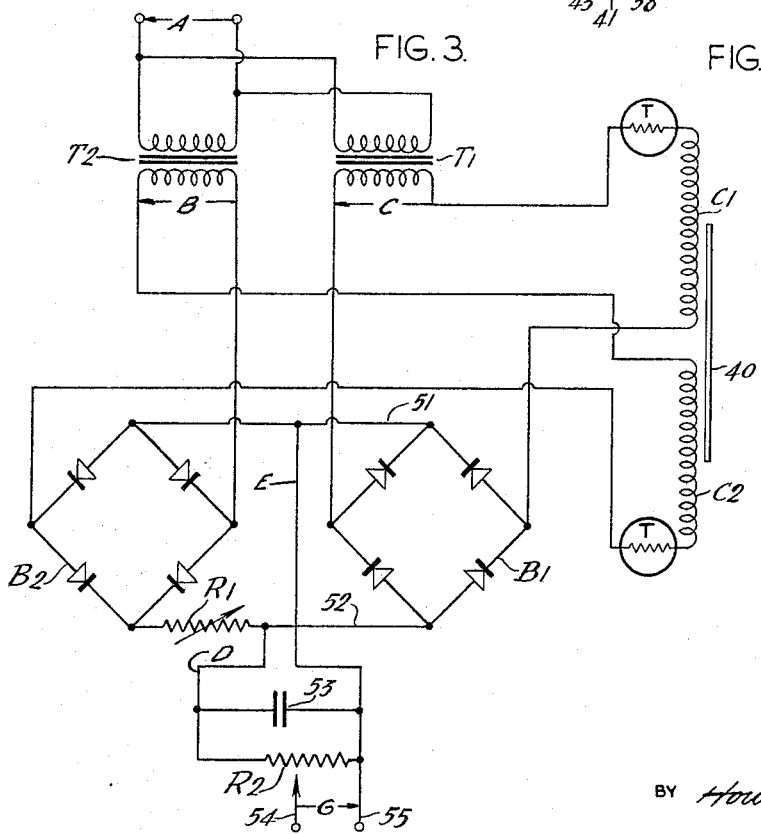
FIG. 3 is a wiring diagram of a circuit embodying the invention.

The transmitter circuit which is housed in the casing 45 is shown in diagram in FIG. 3. Here it is seen that a transformer is provided for each of the coils C1, C2, a transformer T1 being connected to coil C1 and a transformer T2 being connected to the coil C2. The armature 40 is indicated in association with the coils.

A double full wave rectifier bridge unit is connected to the transformers and coils, one rectifier bridge B1 being connected to transformer T1 and coil C1 and being designed to conduct in one direction only to common output connections 51, 52, and the other rectifier bridge B2 being connected to the other transformer T2 and coil C2 and being designed to conduct in the other direction only to the common output connections 51, 52.

A variable resistance R1 is provided in the lead from the rectifier bridge B2 to the output connection 52 to adjust the value of the output from rectifier bridge B2 relative to the output from the rectifier bridge B1. This will be referred to as the zero setting resistance.

A filter unit, including a capacitor 53 is provided between the output connections or conductors 51 and 52. A span setting resistor R2 with an output varying contact connection 54 is provided beyond the filter unit, the other side of the circuit being continued to an output connection or conductor 55.

Figure 4:
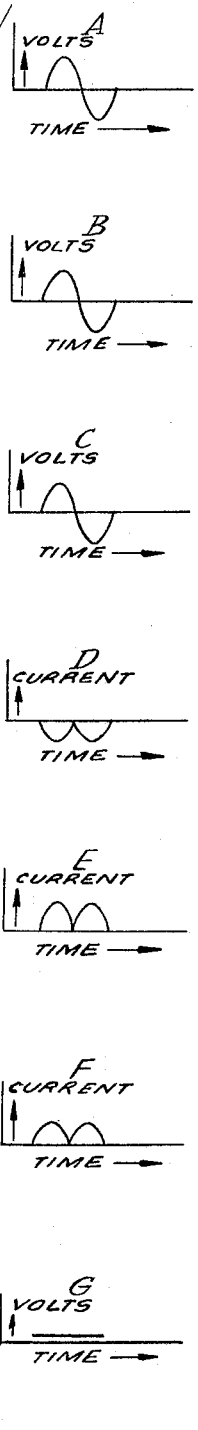
FIG. 4 shows a group of current and voltage waveforms existing at various points in the circuit of FIG. 3.

FIG. 4 shows the voltage and current waveforms existing at various points in the circuit of FIG. 3, as indicated by corresponding letters in FIG. 3 and FIG. 4. In each of the graphs of FIG. 4 the abscissae represent time. Thus curve A of FIG. 4 represents the voltage at A in FIG. 3, and comprises the usual alternating line-voltage sinusoidal curve. Curves B and C of FIG. 4 show that the voltages across the secondaries of transformers T2 and T1 respectively are equal and of the same form as the input line voltage A. The voltage B is applied across the series combination of coil C2 and the input terminals of bridge B2, so that the input voltage to bridge B2 varies in accordance with changes in the inductance of coil C2 produced by motion of armature 40. Similarly, the sinusoidal voltage C, equal to the sinusoidal voltage B, is applied across the series combination of coil C1 and the input terminals of bridge B1, so that the input voltage to bridge B1 varies in accordance with the inductance of coil C1 as determined by the position of armature 40. Each of the rectifier bridges B1 and B2 operates internally in the manner normal for such bridges. Due to the orientation of the diodes in the two bridges, the upper output terminal of bridge B1 is positive with respect to its lower output terminal, while for bridge B2 the upper output terminal is negative and the lower output terminal is positive. Accordingly connection 51 connects directly together the positive output terminal of bridge B1 and the negative output terminal of bridge B2, while variable resistor R1 and connection 52 connect together the negative terminal of bridge B1 and the positive terminal of bridge B2. The result is that the respective current components which the two bridges tend to produce through the resistor R2 are in opposite directions, and, when R1 is adjusted to zero and armature 40 is in the central position represented in FIG. 3, the latter currents are equal so that no resultant current flows through resistor R2 and the voltage across R2 is zero. More particularly, bridge B1 and transformer T1 tend to produce a positive current component to the left through resistor R2, while bridge B2 and transformer T2 tend to produce a positive current component to the right through resistor R2. With R1 adjusted to a finite value to provide imbalance between the bridge output currents, the output current which bridge B2 and transformer T2 tend to produce through R2 is made smaller than that which bridge B1 and transformer T1 tend to produce by an amount determined by the magnitude of R1.

FIG. 4E represents the positive current component flowing downwardly at E from bridge B1 in FIG. 3, while FIG. 4D represents the negative current component flowing downwardly at D from bridge B2, the waveform of FIG. 4D being represented as negative because the flow is in the direction opposed to the current shown at FIG. 4E, and as smaller than the current in FIG. 4E because of the presence of the imbalancing resistor R1. The sum of the two currents shown in FIGS. 4D and 4E is represented in FIG. 4F and is positive; this sum current produces a net output voltage G at output terminal 55 which is smoothed by the action of capacitor 53 to produce a relatively constant, positive, output voltage, as indicated in FIG. 4G. The D.C. level of the voltage G varies with position of armature 40, and the adjustment of resistor R1 determines the position of the armature 40 for which zero output voltage is produced; R1 therefore constitutes a zero-setting control. The position of output terminal tap 54 is adjustable to vary the fraction of the voltage across resistor R2 which is delivered between output terminals 54 and 55, and hence serves as a span control to determine the maximum and minimum output voltages produced by opposite extreme positions of armature 40. To adjust the system for operation, armature 40 may be placed in its initial, lowest position with the spacing between coils C1 and C2, and the position of both coils C1 and C2 with respect to the armature travel, adjusted to provide the desired shape of the characteristic of electrical output vs. armature position. R1 is adjusted to give zero output at 55 with the armature in its lowest, initial position and R2 is adjusted to give the desired maximum output voltage.

As a further refinement there may be provided in the circuit, in series with the coils C1, C2 as shown, temperature compensating means such as thermistors T which are responsive to temperature in a sense opposite to the rest of the circuit so as to decrease resistance when the resistance in the circuit in general increases and vice versa.

By using a rectifier bridge for each coil a dual comparator output is provided; by the use of the zero setting variable resistance R1 the difference of the magnitude of the output of one coil relative to the other can be varied as desired so as to adjust the zero output signal to occur at the beginning of the working stroke; and by the use of the span setting variable resistance R2 the strength of the final signal can be varied so as to cause the 100% stroke point of the armature to produce the 100% value of the output electrical signal. The adjustment for making the output signal from connections 54 and 55 compatible to various types of receivers is accomplished by means of conventional resistors located beyond the connections 54 and 55 (not shown). Typical standard types of D.C. signals which can be obtained with the unit described are as follows: 0–5 mv., 0–50 mv., 10–50 mv., 0–1 v., .25–1.25 v., 0–500 ma., 0–1 ma., 0–5 ma., 1–5 ma., 4–20 ma. The circuit not only provides a single D.C. output as the resultant of the relative effects produced directly by the rotameter coils without amplification and without using a rebalance or feedback circuitry but also provides an output of sufficient strength to directly satisfy many available receivers which operate recorders, control mechanism and the like. As stated, the output can be as much as 1¾ volt, and up to 20 milliamperes D.C. So far as known, this has never been done before without the use of expensive intermediate components or more expensive and complex electrical circuitry.

In FIG. 5 there are shown several typical rotameter calibration curves which are to be matched by the transmitter output curve in order to achieve linearity of output to the receiving unit. Curve 5.1 is relatively straight with a slight convexity near the lower end; curve 5.2 has a pronounced convexity or bump near the lower end; curve 5.3 also has a pronounced bump near the lower end; curve 5.4 has both convexity and concavity or positive and negative bumps; and curve 5.5 has two positive bumps and one negative bump.

Figure 12:
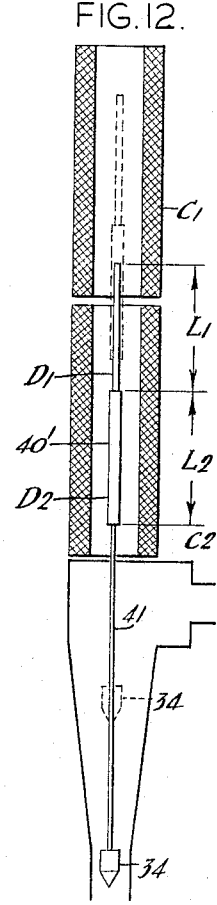
FIG. 12 is a diagram like FIG. 8 but showing a split or multi-diameter armature.
Figure 13:
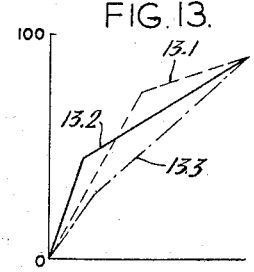
FIG. 13 is a diagram showing an idealized set of curves produced by the FIG. 12 arrangement by changes in length of the armature segments, the diameters selected being kept constant and the diameter of the lower segment being larger than the diameter of the upper segment.
Figure 14:
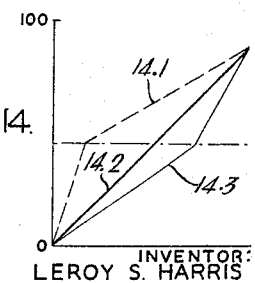
FIG. 14 is a diagram like FIG. 13 but showing the effects of keeping the armature segment lengths equal while varying the segment diameters.
Figure 16:
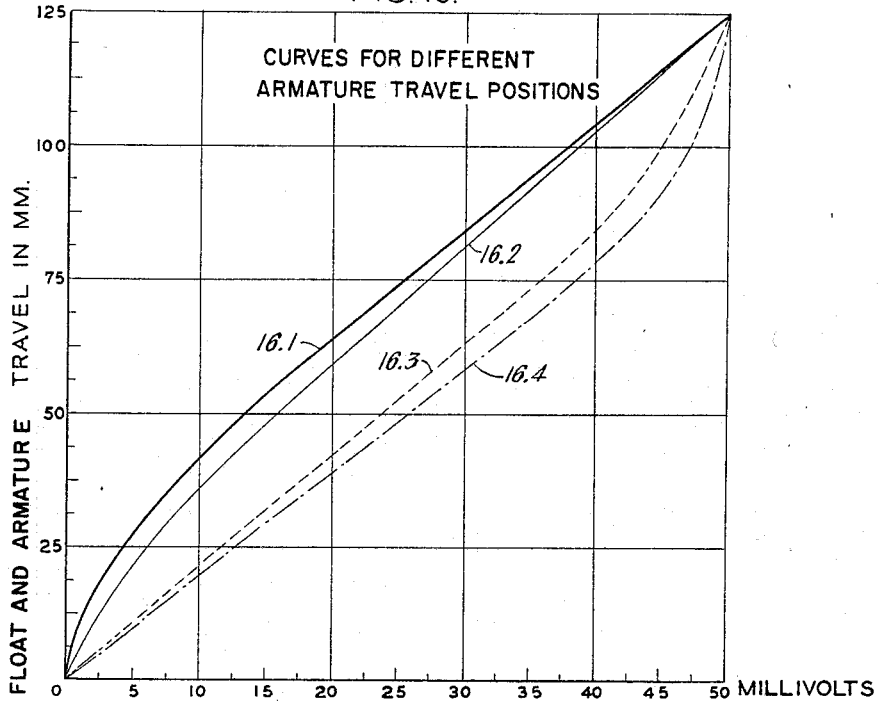
FIG. 16 is a diagram like FIG. 15 but showing a few curves produced for different initial armature settings when the coils are spaced apart by nine unit spacers.
Figure 17:
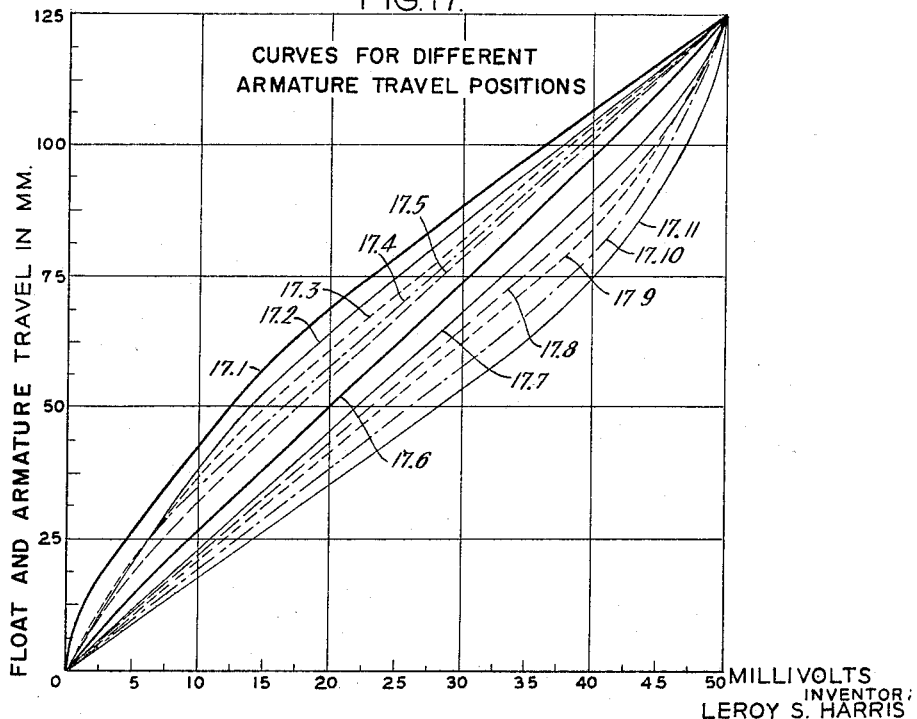
FIG. 17 is a diagram like FIG. 15 but showing the effect of using fifteen unit spacers.
Figure 18:
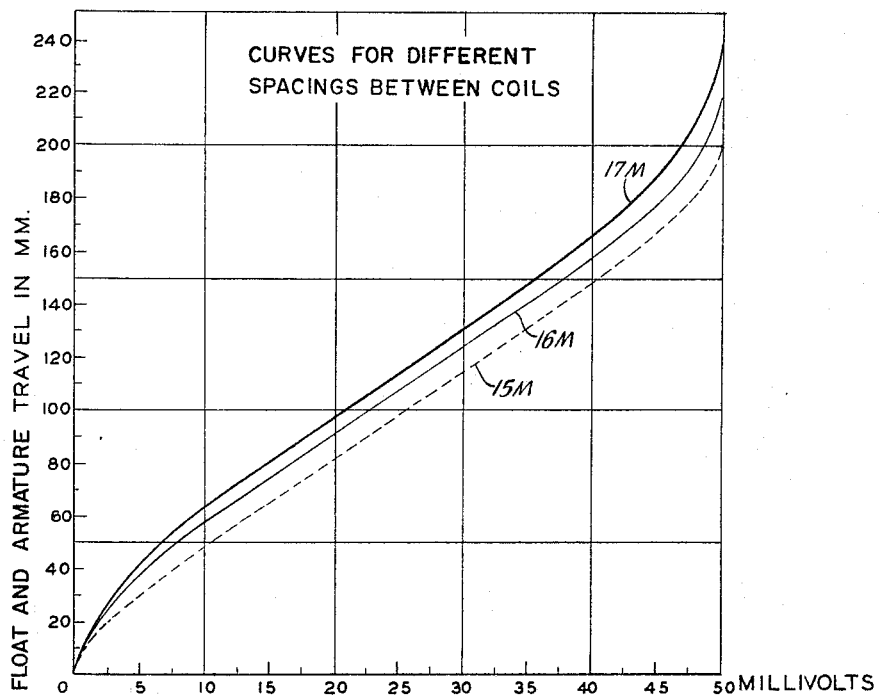
FIG. 18 is a graphical representation which shows the basic full-length curves corresponding to the families of curves shown in FIGS. 15, 16 and 17.

The circuit hereby provided in particularly well adapted for use in matching flow curves (FIG. 5) with electrical output curves, and the zero and span adjustments are required in the matching of such flow curves and in adjusting to the requirements of the receiving sets; however, it is not possible to match all flow curves by the circuit adjustments above. The invention provides other methods of attaining substantially complete matching of any flow calibration curve which may be presented. These supplemental procedures will include one or more of the following arrangements:

(1) Changing the initial position of the armature relative to the coils, as shown in FIGS. 6 to 11 and in the curves of FIGS. 15 to 17, this, of course, including, as well, the adjustment of the coils relative to the armature, if more convenient;

(2) Using armature segments of different sizes, diameters or lengths or both, as shown in FIGS. 12 to 14;

(3) Changing the distance between coils as shown in the curves of FIG. 18.

Figure 6:
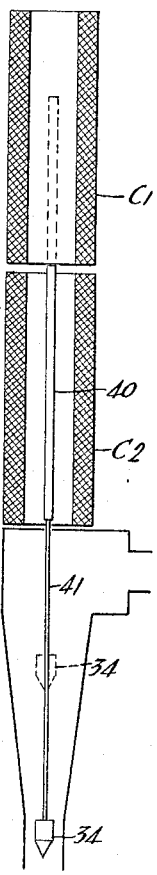
FIG. 6 is a diagrammatic vertical section through a rotameter and coils to show the armature in a lower initial travel position.
Figure 7:
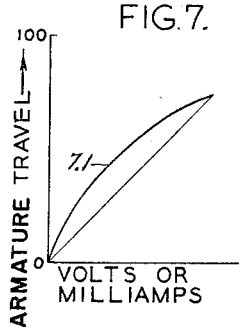
FIG. 7 is an idealized curve of armature travel plotted against output electrical signal of the FIG. 6 arrangement.
Figure 9:
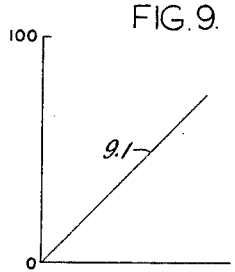
FIG. 9 is an idealized curve produced by the setting of FIG. 8.

FIG. 6 shows the armature 40, here a simple armature of uniform diameter, in a first or lowest setting position, the dotted line indicating its highest travel position with the float 34. FIG. 7 shows that when the armature travel is largely in the lower coil C2 the curve 7.1 of the signal of armature travel vs. millivolt output is convex upward.

Figure 8:
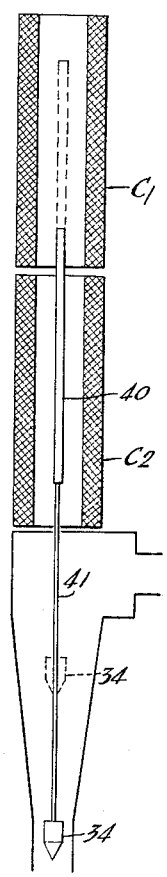
FIG. 8 is a view like FIG. 6 but showing the armature in a higher initial position.

FIG. 8 shows the armature 40 in a second or medial position, its normal position of use unless otherwise stated. Here its travel is equally divided between coils C1 and C2 and the resultant output curve is substantially a straight line, as shown at 9.1 in FIG. 9.

Figure 10:
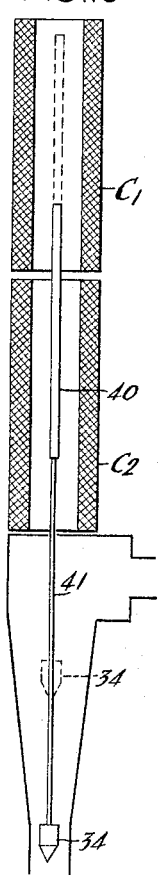
FIG. 10 is a view like FIG. 6 but showing the armature in a still higher initial position.
Figure 11:
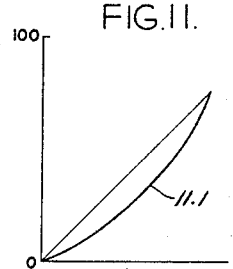
FIG. 11 is an idealized curve produced by the setting of FIG. 10.

FIG. 10 shows the armature 40 in a third or highest setting position, the upper end of its travel being about to the upper end of coil C. FIG. 11 shows that the curve 11.1 is concave.

FIGS. 12 to 14 show the effects of making the armature segments of different diameters and different segment lengths. Only a single total length is here considered and the armature is set as a unit in a medial or normal position where its travel or working stroke is equally divided between coils C1 and C2. The armature as a whole is designated as 40'; the length of the upper segment is designated as L1 and its diameter as D1; and the length of the lower segment is designated as L2 and its diameter as D2.

FIG. 13 shows that when the diameter D1 of the upper segment is less than the diameter D2 of the lower segment, the condition of FIG. 12, and the length L2 of the lower segment is less than the length L1 of the upper segment the curve 13.1 has a bump toward its upper end; when L1 and L2 are equal, the bump of curve 13.2 is near the lower end; and when L1 is less than L2, the bump of curve 13.3 is nearer the lower end.

FIG. 14 shows that when the lengths L1 and L2 are kept equal and the diameters varied, the curve 14.1 has a bump near the lower end and is convex when D1 is less than D2; the curve 14.2 is substantially straight when D1 and D2 are equal; and that curve 14.3 has a bump near the upper end and is concave when D2 is less than D1.

It will be understood that all of the curves of FIGS. 7, 11, 13 and 14 have been shown out of actual proportion for illustrative purposes.

In anticipation of the requirement to match various flow-rate curves much can be done in preliminary preparation.

For example, FIG. 15 shows a family of actual curves which were produced by one fixed setting of the coils C1 and C2, here with two spacers between them, and with different settings of the armature. The total length of armature travel space (for the lower end of an 8" armature) in these coils was 200 mm. and with a work travel of 125 mm. for the armature, the armature was set at different positions relative to the coils. Curve 15.1 is for a setting where the lower end of the armature moves from 0 to 125 mm.; curve 15.2 for 5 to 130 mm.; curve 15.3 from 15 to 140 mm.; curve 15.4 for 35 to 160 mm.; curve 15.5 for 50 to 175 mm.; curve 15.6 for 60 to 185 mm.; curve 15.7 for 70 to 195 mm.; and curve 15.8 for 75 to 200 mm.

FIG. 16 is similar to FIG. 15 but shows the effect of increasing the spacing between coils, 9 spacers being used here and the total travel length of the lower end of the armature being 0 to 220 mm. Many of the curves are omitted here but the trends can be followed from those which are shown. In curve 16.1 the armature end travel is from 0 to 125 mm.; in curve 16.2 the travel is from 10 to 135 mm.; in curve 16.3 the travel is from 85 to 210 mm.; and in curve 16.4 the travel is from 95 to 220 mm.

FIG. 17 is similar to FIG. 15 but shows the effect of further increasing the spacing between coils, 15 spacers being used and the total travel length of the lower end of the armature being 0–240 mm. In curve 17.1 the armature end travel is from 0 to 125 mm.; in curve 17.2 the travel is from 10 to 135 mm.; in curve 17.3 the travel is from 20 to 145 mm.; in curve 17.4 the travel is from 30 to 155 mm.; in curve 17.5 the travel is from 40 to 165 mm.; in curve 17.6 the travel is from 55 to 180 mm.; in curve 17.7 the travel is from 75 to 100 mm.; in curve 17.8 the travel is from 85 to 210 mm.; in curve 17.9 the travel is from 95 to 220 mm.; in 17.10 the travel is from 105 to 230 mm.; and in curve 17.11 the travel is from 115 to 240 mm.

The effects of changing the distance between coils becomes more apparent from the combined full-length curves of FIG. 18, which are the master curves 15M, 16M, 17M for the families of curves of FIGS. 15, 16 and 17 respectively.

It is not necessary to show curves which can be produced by combining the variables provided but the general effects produced by different variation of armature travel, coil spacing and armature segment lengths and diameters will be fully evident from the above discussions and accompanying illustration. It will be noted that in all cases the armature is considerably shorter than the combined coil length and always operates within the space between the ends of the coils. By using two coaxial coils and by first differentiating the effects produced from the coils and then reversely rectifying the outputs from coils, establishing an imbalance between the rectified outputs and then smoothing the resultant summation output there is provided a D.C. output signal of great strength and one which is responsive directly to variations which are made in armature and coil arrangements to match various flow curves.

Figure 20:
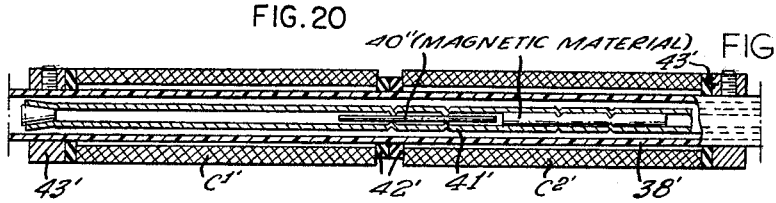
FIG. 20 is a fragmentary sectional view illustrating a modified form of a portion of the apparatus shown in FIG. 2A.

A further procedure which may be used is to provide a space between armature segments by a non-magnetic connection which gives the effect of an air gap. This can be done very simply by making the armature in two parts or segments as indicated in FIG. 12 and securing the segments at required positions (FIG. 20) within the non-magnetic tube 41 which is also used as a connection to the float. A slight crimping action is all that is required to secure an armature or armature segment at a required position along the carrying tube.

In practice it has been found that flow curves can be matched to plus or minus 2% and most parts of curves matched to plus or minus 1%, which is well within normal requirements.

In some cases it may desirable to use the double full wave rectifier arrangement where the coils C1 and C2 are not separable but are integrally wound with a primary transformer coil. It is also to be noted that the electrical motion or position transmitter calibrating devices and circuitry are also applicable to coils and working strokes both longer and shorter than shown.

Figure 19:
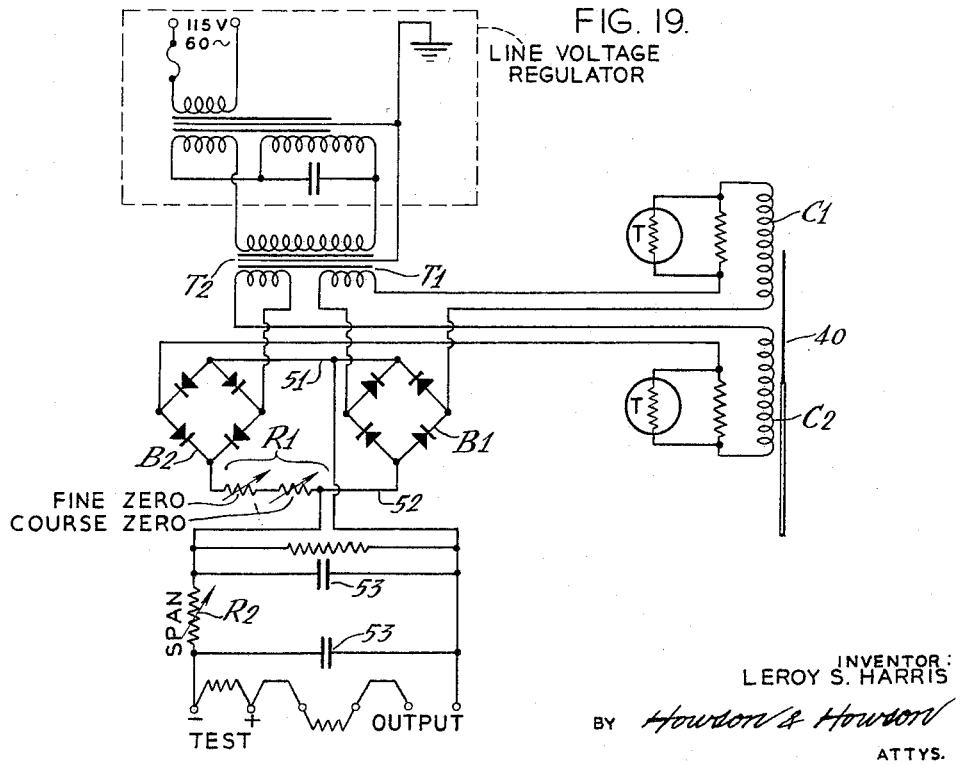
FIG. 19 is a circuit diagram showing a modified form of the circuit of FIG. 3.

A refinement of the FIG. 3 circuitry is shown in FIG. 19. This includes a built-in voltage regulator, which has been so designated in the drawing, a single transformer having two secondaries T1, T2, temperature compensators T, here in parallel with resistors, coarse and fine zero adjustment, finer filtering circuits to maintain output signal ripple to within ⅛% and test terminals for checking output signal with precision potentiometer. The basic circuitry is the same as in FIG. 3 and the same reference characters are used as before.

It is thus seen that the invention provides an improved transmitter and improved method and means for adjusting the same to match various calibration curves and various receiving sets.

While one embodiment of the invention has been described for purposes of illustration it is to be understood that there may be various embodiments and modifications within the general scope of the invention.

I claim:

Apparatus for producing electrical signals indicative of the rate of flow of a fluid, comprising:

a movable mechanical member the displacement of which from a reference position thereof is non-linearly related to the rate of flow of a fluid;

an elongated armature member having magnetic material at least at its opposite ends;

a first coil and a substantially-identical second coil each surrounding said armature member and each axially adjustable in position with respect to the other of said coils and with respect to said armature member;

means for moving said armature member through said coils from an initial position thereof in response to displacement of said mechanical member;

a first rectifier bridge having a pair of input terminals and a pair of output terminals;

a second rectifier bridge having a pair of input terminals and a pair of output terminals;

a source of alternating voltage;

means for a applying said alternating voltage in constant amplitude to said first coil and said pair of input terminals of said first bridge in series;

means for applying said alternating voltage in constant amplitude to said second coil and said pair of input terminals of said second bridge in series;

first means connecting the positive output terminal of said first bridge to the negative output terminal of said second bridge;

second means connecting the negative output terminal of said first bridge to the positive output terminal of said second bridge;

a bridge load impedance connected between said first and second connecting means, and including a resistive element connected between said first and second connecting means and a filter capacitor for smoothing variations in voltage across said load impedance;

one of said first connecting means comprising a variable resistor connected between said load impedance and one of said bridges for controllably imbalancing the current components produced in said load impedance by said bridges;

said load impedance comprising a pair of output terminals and a variable impedance element for controlling the fraction of the voltage developed across said load impedance which is applied to said last-named output terminals;

the distance between opposite ends of said coils being at least as great as the length of said armature member; and adjustable means for enabling adjustment of the positions of said coils relative to the travel of said armature member so that the ends of said armature member remain within said coils in response to said displacement of said mechanical member;

the adjustment of said variable resistor, of the relative positions of said coils, and of said armature member travel being such that said voltage across said bridge load impedance varies substantially proportionally to said displacement of said mechanical member.

References Cited by the Examiner

UNITED STATES PATENTS

| | | | |
|---|---|---|---|
| 2,411,330 | 11/1946 | Melas | 340—195 |
| 2,495,157 | 1/1950 | Browne | 340—199 |

FOREIGN PATENTS

| | | |
|---|---|---|
| 115,548 | 7/1942 | Australia. |

NEIL C. READ, *Primary Examiner.*

THOMAS B. HABECKER, *Examiner.*